United States Patent [19]

Moisson et al.

[11] Patent Number: 5,426,715
[45] Date of Patent: Jun. 20, 1995

[54] OVAL PORT SEAL AND METHOD USED FOR AN OPTICAL FIBER CABLE CLOSURE

[75] Inventors: Marc Moisson, Los Altos, Calif.; Kevin Melia, Heverlee, Belgium; Mark McCall, San Jose, Calif.; Mathew Steinberg, Santa Clara, Calif.; David Wittmeier, Menlo Park, Calif.; Jeff Haller, San Francisco, Calif.; Lowell Koht, Foster City, Calif.

[73] Assignee: Raychem Corporation, Menlo Park, Calif.

[21] Appl. No.: 97,333

[22] Filed: Jul. 23, 1993

[51] Int. Cl.⁶ .................. G02B 6/36; H02G 15/02; B65H 69/02
[52] U.S. Cl. ............................. 385/76; 385/77; 385/78; 385/86; 385/87; 385/139; 174/70 R; 174/74 R; 174/77 R; 156/158; 156/166
[58] Field of Search .................. 385/76, 70, 77, 78, 385/84, 86, 87, 136, 137, 138, 139, 147; 174/70 R, 72 R, 72 C, 74 R, 77 R, 138 F, 139, 140 R, 145, 151, 153 G, 152 G, 166 R, 168, 176; 156/158, 166

[56] References Cited

U.S. PATENT DOCUMENTS

| | | | |
|---|---|---|---|
| 3,984,623 | 10/1976 | Worden | 174/138 F |
| 4,095,044 | 6/1978 | Horsma et al. | 174/138 F |
| 4,117,259 | 9/1978 | Giebel et al. | 174/92 |
| 4,538,021 | 8/1985 | Williamson | 174/92 |
| 4,548,465 | 10/1985 | White | 385/136 X |
| 4,549,040 | 10/1985 | Goetter | 174/92 |
| 4,692,564 | 9/1987 | Campbell et al. | 174/92 |
| 4,743,088 | 5/1988 | Balyasny et al. | 385/136 X |
| 4,761,051 | 8/1988 | Crespo-Ruiz et al. | 385/76 X |
| 4,764,232 | 8/1988 | Hunter | 156/48 |
| 4,831,215 | 5/1989 | Clark et al. | 174/92 |
| 4,839,472 | 6/1989 | Pichler | 173/138 F |
| 4,839,473 | 6/1989 | Fox et al. | 174/138 F |
| 4,849,580 | 7/1989 | Reuter | 174/92 |
| 4,861,946 | 8/1989 | Pichler et al. | 174/92 |
| 4,865,890 | 9/1989 | Erlichman | 428/35.1 |
| 4,865,893 | 9/1989 | Kunze et al. | 428/36.9 |
| 4,914,261 | 4/1990 | Tokumaru et al. | 174/92 |
| 4,924,034 | 5/1990 | Truesdale et al. | 174/87 |
| 4,963,700 | 10/1990 | Olsen et al. | 174/138 F |
| 4,983,236 | 1/1991 | Zollner | 156/52 |
| 5,030,798 | 7/1991 | Schilling | 174/92 |
| 5,068,494 | 11/1991 | Bolante | 174/65 SS |
| 5,074,639 | 12/1991 | Smith | 385/100 |
| 5,097,530 | 3/1992 | Holt et al. | 385/135 |
| 5,113,038 | 5/1992 | Dehling | 174/92 |
| 5,113,475 | 5/1992 | Baker | 385/138 |
| 5,138,691 | 8/1992 | Jenkins | 385/138 |
| 5,151,967 | 9/1992 | Ebinuma | 385/137 X |
| 5,155,794 | 10/1992 | Nolf et al. | 385/135 |
| 5,162,142 | 11/1992 | Ericson et al. | 428/77 |
| 5,214,735 | 5/1993 | Henneberger et al. | 385/136 |
| 5,280,556 | 1/1994 | Jones | 385/139 |
| 5,283,853 | 2/1994 | Szegda | 385/139 |
| 5,305,413 | 4/1994 | Payne | 385/138 X |
| 5,313,539 | 5/1994 | Ogawa et al. | 385/76 |

FOREIGN PATENT DOCUMENTS

| | | | |
|---|---|---|---|
| 0505104A1 | 9/1992 | European Pat. Off. | G02B 6/44 |
| 2515939B2 | 12/1977 | Germany | H02G 15/18 |
| 3739714C1 | 2/1989 | Germany | H02G 9/06 |
| 4135570C1 | 10/1991 | Germany | H02G 15/08 |
| 4142586A1 | 6/1993 | Germany | H02G 15/08 |
| 1594818 | 8/1981 | United Kingdom | H02G 15/113 |
| WO90/05401 | 5/1990 | WIPO | H02G 15/18 |
| WO90/08336 | 7/1990 | WIPO | G02B 6/36 |
| WO93/15346 | 8/1993 | WIPO | H02G 15/013 |

Primary Examiner—Brian Healy
Attorney, Agent, or Firm—Herbert G. Burkard; A. Stephen Zavell

[57] ABSTRACT

The invention provides for a cold applied oval port seal particularly useful for sealing optical fiber cables. The closure includes two shell members which fit together to define the enclosure edge wedge seals and internal flexible fingers to locate the optical fibers, restrain movement of the sealing material, and provide strain relief along the longitudinal axis of the cables.

19 Claims, 1 Drawing Sheet

OVAL PORT SEAL AND METHOD USED FOR AN OPTICAL FIBER CABLE CLOSURE

TECHNICAL FIELD OF THE INVENTION

This invention relates to port seals. In particular this invention relates to cold applied oval port seals. Specifically, the oval port seal is used for an optical fiber closure.

BACKGROUND OF THE INVENTION

In the telecommunications industry when optical fibers in a cable need to be broken out from the main cable or active electronics need to be added into the system, this requires splitting open the optical fiber cable. The split open cable needs to be sealed. Although it is easier to seal a cable going into or out of the closure with a circular hole or passage, it is often necessary for working room to use an oval port which presents a more complex sealing problem. The seal may be included in an in-line closure where the fiber cable comes in one side of the closure and either a new cable or the original cable emanates from the other side of the enclosure or what is known as a "butt" splice closure where the cable or the cable it is spliced to is put into one side of the enclosure and re-emanates from the same side of the closure base member with generally a dome shaped top that attaches to the base member, i.e. the portion of the closure where the cables enter or exit. U.S. Pat. No. 5,155,794 and U.S. application Ser. No. 08/008,227, now U.S. Pat. No. 5,235,337, (WO 90/08336); and U.S. Pat. No. 5,097,530 describe preferred optical fiber butt splice closures. A butt splice closure with an integral but detachable electronics package is described in Ser. Nos. 07/439,898, abandoned, and 08/000,991, now U.S. Pat. No. 5,261,024. The disclosures of each of these patents or applications are completely incorporated herein by reference for all purposes into this specification.

Because of common trenching "gas lines and communication lines in the same trench", there has been a tendency to seek a non-heat shrinkable sealing, i.e. cold applied sealing product for those places where the cables enter and exit from the closure. Since heat shrinkable materials are fast, efficient, and provide excellent sealing with additional benefits of long lifetime and strain relief, creating a cold applied closure that can be installed over a wide variety of temperature ranges and provide sealing when subjected to repeated thermal cycling from $-40°$ C. to $+60°$ C., optionally, under a positive pressure is difficult. Creating a mechanical cold seal which can be applied in a restrictive base environment wherein the base may be only a foot or less across is even more complex.

SUMMARY OF THE INVENTION

The invention provides for the previously desired features as well as many other benefits obvious to the ordinary skilled artisan upon reading the summary and detailed description of the invention. The invention also provides for a mechanical cold applied seal to the oval port on, for example, an optical fiber butt closure which can maintain a seal over repeated temperature cycling from $-40°$ C. to $+60°$ C. and, when necessary, at positive pressures of, for example, about two psi. The oval port end seal includes redundant mastic sealing in conjunction with internal strain relief and optional cable grommet centering to protect and seal the optical fibers.

The seal is designed to be applied in the tight base environment of a butt splice closure and use only standard telecommunication repair tooling such as general "CAN" wrenches, i.e. ⅜" and 7/16" hex head drivers. Additionally, the seal provides for removal and access to the cables in the event future changes in the closure are necessary. The invention provides for additionally a complete butt splice closure with an optional electronics package.

BRIEF DESCRIPTION OF THE DRAWING(S)

FIG. 1 shows an exploded view of the oval port end seal of the present invention in conjunction with an optical fiber closure.

DESCRIPTION OF THE PREFERRED EMBODIMENTS

Figure 1:
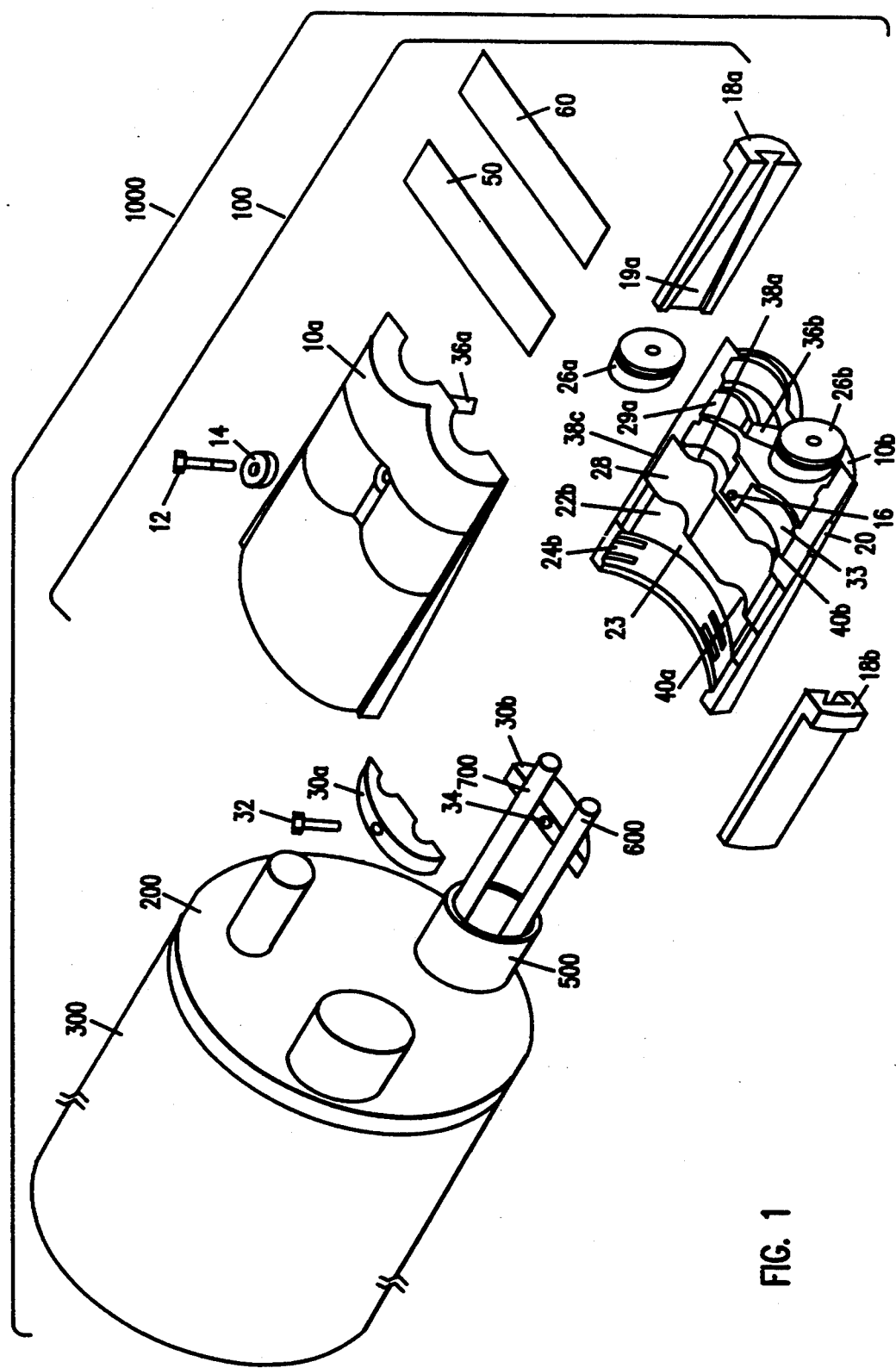

An example of a particularly preferred embodiment of the invention will be described in reference to the Figure. More specifically, the oval port seal closure 1000 of the present invention is illustrated in the Figure. The end seal 100 includes oval port shell halves 10a and 10b which are formed together with the bolt 12 and a washer 14 and a molded receptacle nut 16 in part 10b. Alternatively, a molded or pressed in place receptacle nut may be in both halves and a captured bolt, i.e. a bolt with a threaded end and smooth shaft adjacent the bolt head, is used to join the parts. A further benefit of having the nut receptacle in both halves is that the parts are then hermphoditic which lowers costs and avoids incorrect installation.

The shell halves 10a and 10b are further sealed along the edges by wedge shaped edge retainers 18a and 18b. When joined together, the body edges form an expanding in cross-section trapezoidal shape. Although any suitable locking shape is acceptable. These edge seals preferably have a central groove 19a, deeper than the expanding trapezoidal in cross-section edge rail groove, to provide clearance for easy movement and an expansion slot for excess mastic. In operation shell halves 10a and 10b are mated, the bolt and washer 12 and 14 are turned to form an initial seal on the oval port 100 and the edge wedges 18a and 18b are placed on the edges to provide additional sealing and strain relief therealong. Molded into the shells 10a and 10b are click stops 20a (20b not illustrated) which flex downward upon the application of the wedges 18a and 18b and then click up when the wedge is fully engaged to create the seal. The click stops prevent the wedges 18a and 18b from sliding off over long periods of time and/or during thermal cycling and/or vibrating off in harsh environments. When the shells need to be re-opened, the flexible click stop fingers 20a and 20b of the edge are depressed and the wedges 18a and 18b are slid off.

The end seal 100 in conjunction with the base member 200 and the dome 300 unit forms a butt splice closure seal 1000. The dome may be joined to the base by any suitable sealing structure such as heat shrinkable plastic of U.S. Pat. No. 5,155,794 or a grooved slot and ring of U.S. Pat. No. 5,097,530 and U.S. Pat. No. 08/008,227, U.S. Pat. No. 5,353,337, or a self centering clamp and ting structure of U.S. Pat. No. 07/439,898, abandoned, U.S. Pat. No. 07/473,143, abandoned, (WO 90/05930) and U.S. Pat. No. 4,924,034. As provided before, each patent or application is completely incorporated herein by reference.

The two shells 10a and 10b define the sealing body which surrounds the oval port 500 of the closure. Suitable materials for the body shell halves 10a and 10b must have good chemical resistance, minimum elongation under installed load, i.e. preferably less than 5%, impact resistance, low moisture absorption, good molding processability, UV resistance and durability over −40° C. to +60° C. Examples are plastics such as a glass filled polypropylene. Suitable materials for the wedge pieces 18a and 18b are similar to the housing halves but the material must also exhibit low creepage. Examples are plastics such as glass filled materials such as nylon or polyamides.

In the interior of the closure 100 are plastic inserts 24a and 24b having teeth, knife like edges or other high friction engagement members to engage the oval port 500. Suitable materials are glass filled nylon. Optionally, the shells may include the teeth, knife edges, and the like as molded into the shell where the shell material is sufficiently hard to bite into, i.e. engage, the port 500. Between these oval port inserts and the mastic seals 28a and 28b which are sandwiched between flexible fingers 38a and 38b and 40a and 40b, is a region 22a and 22b which contains a layer of sealant material 23 to seal to the oval port 500. These double sets of fingers and their outward angle improves installation and strain relief along the longitudinal cable axis. Preferably the fingers are molded into the body closure rather than any insert. A suitable sealing material is mastic such as butyl, EPDM, epoxy or silicone mastic. A preferred mastic is a crosslinked butyl mastic which flows under pressure, but not temperature. The fingers in the closure body taper towards the closure openings and a passage in the body between the regions 22 and region between the fingers permits the sealants 23 and 28 to merge upon clamping of the closure. Thus the design provides for a seal to the port and completely around the cables as well as ensuring exclusion of leak paths.

For cable strain relief, a yolk or harness 30a and 30b having two half apertures for each adjacent cable is included. The bolt 32 is bolted at to hold the cables firmly while providing strain relief. This yolk assists in containing and sealing cables of different sizes while providing strain relief regardless of the cable size. This unit is sized to fit within a space 29a and 29b between the sealant expansion region 33 and the grommet receiving portion of the body halves.

Within the internal fingers is unit of a suitable sealing material 28 which will seal to the cable. Suitable materials are those specified for seal 23 such as mastics and preferably cross-linked butyl mastics. These fingers provided adequate sealing and resistance to movement of the cable if they are pulled or yanked in any direction along their longitudinal axis as well as mastic retention. The spacing between the fingers is sufficient to minimize mastic extrusion, e.g. about ⅛" or less. Preferably the fingers are thicker at their base in the closure and are at an outward angle somewhat less than 90° from the plane along the base such as 85° to 88°, i.e. angle towards the closure openings. This outward angle of 85°/88° or 102°/105°, when viewed from a common perpendicular, help to ensure a predisposition to deflect outward, centering the cable, providing longitudinal push/pull strain relief and room for sealant expansion.

The body halves further include a sealant expansion region 33 between the cable strain relief accepting region 29 and the flexible fingers. This provides room for sealant expansion upon installation of large cables and/or during thermal cycling.

On the edge of the closure away from the oval port are grommet centering seals 26a and 26b to preclude water running down the cables entering the closure and aide in centering of the cables during installation. These grommets have a nested configuration with portions of the grommets removable to accommodate various cable sizes. Suitable grommet materials are rubbers such as silicone, EPDM, or nitrile rubbers. For particularly small cables, additional mastic strips 50 and 60 maybe wrapped around the cables to build them up and provide an adequate seal to the mastic sandwiched between flexible fingers 38 a/b and 40 a/b. Optionally these strips 50 and 60 include a layer which minimizes stretch upon installation, such as a polymeric film of polypropylene.

The two part configuration of these seals, in the preferred embodiments, permits one half of the seal to be slid onto the port 500 of the base 200 and the other one half applied from the outside. A bolt is used to initially join the units. Seals of these configurations have been used to seal varying cable sizes from about 0.35 inches to about 0.77 inches in various combinations when installed at anywhere from room temperature about 20° C. down to about −7° C. and cycled in excess of 100 cycles from −40° C. to 60° C. and at a positive pressure on the order of about 2 psi without failure and optionally under a 10 foot water head.

The invention has been described with respect to particularly a preferred embodiment. Modifications which would have been obvious to one of ordinary skill in the art are contemplated to be within the scope of the invention. For example, the mastic material may optionally be replaced with a gel material having a cone penetration from about 50 to about 150 ($10^{-1}$ mm) according to ASTM D217. A keying structure such as a pin 36 and pin receptacle 38 can be added or molded into the closure halves to assist in putting the body halves together. Additionally, the materials of the components can be varied to other types of plastics and or a cast metal enclosure depending upon the use or application. Extra large cables may require additional redundant sealing. Exterior edge bolts may be used instead of the edge wedges. The oval port seal can be used for oval port closures in the copper telecommunications industry or as bulk head seals in buildings, underground vaults, ships or aircraft. Finally the seal can be modified for circular cable openings.

What is claimed is:

1. A port seal for sealing at least one substantially round cable comprising:
   first and second body shell halves which define an enclosure therebetween, said enclosure having one opening for the application to an oval port and an opening opposite thereto for the cable(s) entering or leaving the enclosure;
   a joining assembly to join the two halves together;
   edge closures to provide additional seals along the longitudinal periphery of the enclosure;
   an oval port gripping portion in each of the body halves; and
   an oval port sealing region in each of the body halves;
   flexible internal cable receiving fingers within the body halves to accept a sealing material therebetween, said flexible fingers restrain the sealing material and provide strain relief and resistance to the cable moving in a direction along the longitudinal axis of the cable(s), said fingers angled outward at an angle less than about 90° with respect to a perpendicular drawn along the longitudinal axis of the body halves and cable(s) passing therethrough.

2. The seal according to claim 1 further including a portion between the flexible fingers and the side opposite the oval port side to accept a cable strain relief yolk and the edge closures are edge wedge closures.

3. The seal according to claim 1 wherein the joining assembly includes a nut receptacle in at least one of the body halves and a bolt.

4. The seal according to claim 3 further including centering grommets for the cable(s) exiting/entering the enclosure.

5. The seal according claim 4 wherein sealing material in the oval port sealing region and between the flexible fingers is a mastic.

6. The seal according to claim 5 wherein the mastic is a cross-linked butyl mastic.

7. The seal according to claim 1 wherein the body section is fabricated from glass filled polypropylene and the assembly to join the halves is a nut and bolt like assembly.

8. The seal according to claim 1 wherein the gripping portion is selected from the group consisting of gripping inserts or a region molded into the body halves or combinations thereof.

9. The seal according to claim 1 further including cable restraining means to restrain adjacent cables and the enclosure having a portion within the body to accept the restraining means between the internal flexible fingers and a region to accept centering cable grommets.

10. The seal according to claim 9 wherein the edge closures are edge wedges and the body halves contain at least one click stop(s) along the edges to receive the edge wedges.

11. The seal according to claim 10 wherein the gripping portion is an insert fabricated from glass filled nylon and the edge wedges are fabricated from a glass filled nylon.

12. The seal according to claim 11 further including a base member of an optical fiber closure and a dome like member to seal to the base member, the combination forming an optical fiber closure.

13. The seal according to claim 10 further including an edge passage between the flexible fingers and the oval port sealing region to permit sealant in each region to exude and join upon installation to form a continuous sealing region.

14. The seal according to claim 13 further including pin and pin receptacle members in the body halves.

15. The seal according to claim 14 wherein the body halves are hermaphroditic.

16. A kit of parts capable of being assembled to form a seal around an oval port comprising two body halve shells, at least one of said halves having a nut member associated therewith, and the other half having a bolt member associated therewith; edge wedges to seal and grip the edges of the body halves; oval port gripping inserts; centering grommets to seal cables emanating from the oval port; and separate mastic seals to the cables within a series of flexible fingers molded into the half shells, said flexible fingers resisting movement of the mastic and the cables along the longitudinal axis thereof of the cables and seal the body halves to the oval port.

17. The kit according to claim 16 wherein the body halves include passages between the flexible fingers and a region between the fingers and the gripping inserts to permit a mastic in said region to join the mastic between the fingers upon the installation of the kit of parts.

18. An optical fiber closure comprising:
a dome shape member capable of sealing to a base member to form an enclosure;
a base member, said base member having at least one oval port therethrough to provide access to the enclosure formed between the dome and base member; and
an oval port seal, said port seal including:
first and second body shell halves which define a port seal enclosure therebetween, said port seal enclosure having one opening for the application to an oval port in the base member and an opening opposite thereto for the cable(s) entering or leaving the port seal enclosure;
a joining assembly to join the two halves together;
edge wedge closures to provide additional seals along the longitudinal periphery of the port seal enclosure;
an oval port gripping portion in each of the body halves;
an oval port sealing region in each of the body halves; and
flexible internal cable receiving fingers within and integral with the body halves to accept a sealing material therebetween, said flexible fingers restrain the sealing material and provide strain relief and resistance to the cable moving in a directional along the longitudinal axis of the cable(s), said fingers angled less than about 90° with respect to a perpendicular drawn along the longitudinal axis of the body halves and cable(s) passing therethrough.

19. A method of sealing cables in an oval port comprising:
joining two body halves around the oval port, said body halves having a port gripping region and a port sealing region and cable sealing region joined by a passage; and
compressing the body halves around the port to seal the port and cables and to drive sealant in the port and cable sealing regions together to form a continuous cable and port seal.

* * * * *

UNITED STATES PATENT AND TRADEMARK OFFICE
CERTIFICATE OF CORRECTION

PATENT NO. : 5,426,715
DATED : June 20, 1995
INVENTOR(S) : Mosson et al

It is certified that error appears in the above-indentified patent and that said Letters Patent is hereby corrected as shown below:

Column 3, line 42, after "at" insert --34--.

Signed and Sealed this

Twelfth Day of September, 1995

Attest:

BRUCE LEHMAN

Attesting Officer                Commissioner of Patents and Trademarks